United States Patent
Qin et al.

(10) Patent No.: US 10,474,409 B2
(45) Date of Patent: Nov. 12, 2019

(54) RESPONSE CONTROL METHOD AND ELECTRONIC DEVICE

(71) Applicant: Lenovo (Beijing) Co., Ltd., Beijing (CN)

(72) Inventors: Yue Qin, Beijing (CN); Wei Su, Beijing (CN); Shurong He, Beijing (CN); Ran Zhang, Beijing (CN); Yingjia Yao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 58 days.

(21) Appl. No.: 14/661,102

(22) Filed: Mar. 18, 2015

(65) Prior Publication Data

US 2016/0085347 A1     Mar. 24, 2016

(30) Foreign Application Priority Data

Sep. 19, 2014 (CN) .......................... 2014 1 0484180
Sep. 22, 2014 (CN) .......................... 2014 1 0486507

(51) Int. Cl.
    *G06F 3/041*          (2006.01)
    *G06F 3/01*           (2006.01)
    (Continued)

(52) U.S. Cl.
    CPC .......... *G06F 3/1423* (2013.01); *G06F 1/1624* (2013.01); *G06F 3/017* (2013.01);
    (Continued)

(58) Field of Classification Search
    CPC ...... G06F 3/0412; G06F 3/017; G06F 1/1624; G06F 3/1423; G06F 3/1415;
    (Continued)

(56) References Cited

U.S. PATENT DOCUMENTS 7,493,151 B2 *    2/2009    Collins ............... H04M 1/0235
                                                                      345/173
7,982,718 B2 *    7/2011    Choo .................. G02B 6/0021
                                                                      345/156

(Continued)

FOREIGN PATENT DOCUMENTS

CN           1960397 A      5/2007
CN         101408817 A      4/2009

(Continued)

OTHER PUBLICATIONS

Office Action regarding Chinese Patent Application No. 201410486507.2, dated Mar. 30, 2018. Translation provided by Unitalen Attorneys at Law.

(Continued)

*Primary Examiner* — Vinh T Lam
(74) *Attorney, Agent, or Firm* — Harness, Dickey & Pierce, P.L.C.

(57) ABSTRACT

A response control method and an electronic device are provided according to the disclosure. The response control method includes: acquiring a first operation input by an operator to an input apparatus of the electronic device, wherein the input apparatus corresponds to a display screen of the electronic device; determining an input position of the first operation based on the first operation; acquiring a motion parameter of the input apparatus relative to the electronic device, in the case where the input position of the first operation is maintained, wherein at least a one-dimensional motion is supported for the input apparatus relative to the electronic device; and determining and responding to an executive instruction based on the input position and the motion parameter, wherein different motion parameters correspond to different executive instructions.

7 Claims, 12 Drawing Sheets

(51) Int. Cl.
  *G06F 3/14* (2006.01)
  *G06F 1/16* (2006.01)
  *G06F 3/0488* (2013.01)

(52) U.S. Cl.
  CPC .......... *G06F 3/0488* (2013.01); *G06F 3/1415* (2013.01); *G06F 2203/0381* (2013.01); *G06F 2203/04103* (2013.01); *G06F 2203/04806* (2013.01); *G06F 2203/04808* (2013.01); *G09G 2340/045* (2013.01); *G09G 2340/0464* (2013.01); *G09G 2354/00* (2013.01)

(58) Field of Classification Search
  CPC . G06F 2203/04806; G06F 2203/04101; G06F 2203/04808; G09G 2354/00; G09G 2340/045; G09G 2340/0464
  USPC ...................... 345/173–179; 178/18.01–20.04
  See application file for complete search history.

(56) References Cited

U.S. PATENT DOCUMENTS

| | | | | |
|---|---|---|---|---|
| 8,519,962 B2 * | 8/2013 | Han | G06F 1/1626 | 345/169 |
| 8,634,871 B2 * | 1/2014 | Mitsunaga | G01C 21/20 | 345/173 |
| 8,760,414 B2 * | 6/2014 | Kim | G06F 1/1624 | 345/173 |
| 8,774,879 B2 * | 7/2014 | Hong | H04M 1/23 | 345/173 |
| 8,825,122 B2 * | 9/2014 | Huang | G06F 1/1624 | 361/679.56 |
| 8,837,155 B2 * | 9/2014 | Park | G06F 1/1624 | 345/168 |
| 8,880,338 B2 * | 11/2014 | Inami | G01C 21/3688 | 345/184 |
| 8,914,064 B2 * | 12/2014 | Tahk | G06F 3/04845 | 455/556.1 |
| 8,938,276 B2 * | 1/2015 | Kwak | G06F 1/1624 | 361/727 |
| 8,964,365 B2 * | 2/2015 | Kim | H04M 1/0237 | 361/679.04 |
| 9,122,392 B2 * | 9/2015 | Lee | G06F 1/1626 | |
| 9,154,592 B2 * | 10/2015 | Siddiqui | G06F 1/1622 | |
| 9,244,534 B2 * | 1/2016 | Tho | G06F 1/1624 | |
| 9,317,198 B2 * | 4/2016 | Kwak | G06F 3/017 | |
| 9,380,719 B2 * | 6/2016 | Onda | G06F 1/16 | |
| 2005/0264540 A1 * | 12/2005 | Niwa | G06F 1/1616 | 345/173 |
| 2006/0250377 A1 * | 11/2006 | Zadesky | G06F 1/1613 | 345/173 |
| 2007/0270193 A1 | 11/2007 | Hsieh | | |
| 2007/0285401 A1 * | 12/2007 | Ohki | G06F 1/1616 | 345/173 |
| 2008/0242359 A1 * | 10/2008 | Seol | G06F 1/1616 | 455/566 |
| 2008/0305838 A1 * | 12/2008 | Joo | H04M 1/23 | 455/566 |
| 2009/0117944 A1 * | 5/2009 | Lee | G06F 1/1624 | 455/566 |
| 2009/0131117 A1 * | 5/2009 | Choi | G06F 1/1616 | 455/566 |
| 2009/0295731 A1 * | 12/2009 | Kim | G06F 1/1616 | 345/168 |
| 2010/0099463 A1 * | 4/2010 | Kim | G06F 1/1624 | 455/566 |
| 2010/0110010 A1 * | 5/2010 | Choi | H04M 1/0235 | 345/169 |
| 2010/0188350 A1 * | 7/2010 | Sawada | H04M 1/0237 | 345/173 |
| 2010/0207903 A1 * | 8/2010 | Kim | G06F 1/1626 | 345/173 |
| 2010/0255862 A1 * | 10/2010 | Mitsunaga | H04M 1/0235 | 455/466 |
| 2010/0279657 A1 * | 11/2010 | Matsuo | G06F 1/1624 | 455/411 |
| 2010/0304793 A1 * | 12/2010 | Kim | G06F 1/1675 | 455/566 |
| 2011/0001715 A1 * | 1/2011 | Cha | H04M 1/0247 | 345/173 |
| 2011/0002096 A1 * | 1/2011 | Thorson | G06F 1/1618 | 361/679.04 |
| 2011/0050975 A1 * | 3/2011 | Chung | G06F 1/1624 | 348/333.02 |
| 2011/0115719 A1 * | 5/2011 | Ng | G06F 1/1613 | 345/173 |
| 2011/0128241 A1 * | 6/2011 | Kang | G06F 1/1643 | 345/173 |
| 2012/0062564 A1 * | 3/2012 | Miyashita | G06F 1/1626 | 345/419 |
| 2012/0133604 A1 * | 5/2012 | Ishizuka | G06F 1/1624 | 345/173 |
| 2012/0146914 A1 * | 6/2012 | Pegg | G06F 1/1624 | 345/169 |
| 2012/0306785 A1 * | 12/2012 | Chien | G06F 1/169 | 345/173 |
| 2013/0021284 A1 * | 1/2013 | Koda | G06F 1/162 | 345/173 |
| 2013/0088447 A1 * | 4/2013 | Becze | G06F 3/1438 | 345/173 |
| 2013/0127735 A1 * | 5/2013 | Motoyama | G06F 3/041 | 345/173 |
| 2013/0128439 A1 * | 5/2013 | Walters | G06F 1/1641 | 361/679.04 |
| 2013/0187894 A1 * | 7/2013 | Ladouceur | G06F 3/0488 | 345/176 |
| 2013/0217443 A1 * | 8/2013 | Lim | H04M 1/0216 | 455/566 |
| 2015/0324000 A1 * | 11/2015 | Park | G06F 3/014 | 345/156 |
| 2015/0379964 A1 * | 12/2015 | Lee | G09G 5/12 | 345/173 |

FOREIGN PATENT DOCUMENTS

CN 201252695 Y 6/2009
CN 102122225 A 7/2011

OTHER PUBLICATIONS

Office Action regarding Chinese Patent Application No. 201410484180.5, dated Oct. 24, 2017. Translation provided by Unitalen Attorneys at Law.

* cited by examiner

RESPONSE CONTROL METHOD AND ELECTRONIC DEVICE

The present application claims the priority of Chinese Patent Application No. 201410486507.2, entitled as "RESPONSE CONTROL METHOD AND ELECTRONIC DEVICE", and filed with the Chinese Patent Office on Sep. 22, 2014, and Chinese Patent Application No. 201410484180.5, entitled as "ELECTRONIC DEVICE", and filed with the Chinese Patent Office on Sep. 19, 2014, the contents of which are incorporated herein by reference in its entirety.

TECHNICAL FIELD

The disclosure relates to the field of information processing technologies, and in particular to a response control method and an electronic device.

BACKGROUND

At present, electronic device is used by more and more users. The electronic device includes a fixed touch screen, and various operations may be performed by the user on the touch screen, for example, an electronic map displayed on the touch screen may be zoomed in or out.

Two ways as follows may be used to perform a zoom-in or zoom-out operation on the electronic device. In a first way, operation buttons related to the 'map' application are displayed on the touch screen while a 'map' application is displayed. For example, a plus button represents a zoom-in operation, and a minus button represents a zoom-out operation. When a click operation is performed by an operator on the touch screen, the electronic device may acquire a current clicked position of the click operation via the touch screen, compare the clicked position with the display position of the operation button, determine the operation button corresponding to the click operation based on the comparison result, and generate an instruction corresponding to the operation button. In this case, the region of the current position can be zoomed in or out once the instruction is executed by the electronic device.

In a second way, a respective instruction is generated by detecting changes of the distance slid by two fingers of the user on the touch screen. Specifically, a zoom-in instruction is generated to zoom in the region of the current position, in the case where the distance changes from smaller to larger; or a zoom-out instruction is generated to zoom out the region of the current position, in the case where the distance changes from larger to smaller.

SUMMARY

The disclosure provides a response control method, which includes: detecting a first operation by an operator on a first body of an electronic device; determining an input position of the first operation on the first body of the electronic device; detecting motion of the first body of an electronic device relative to a second body of the electronic device; and performing a corresponding preset function based on the detected motion.

The disclosure further provides an electronic device, which includes: a first body and a second body, the first body being movable relative to the second body; wherein the electronic device is operable: to detect a first operation by an operator on the first body; to determine an input position of the first operation on the first body; to detect a relative motion between the first body and the second body; and to perform a corresponding preset function based on the detected motion.

BRIEF DESCRIPTION OF THE DRAWINGS

In order to illustrate the technical solutions according to the embodiments of the disclosure more clearly, the drawings to be used in the description of the embodiments are described briefly hereinafter. Apparently, the drawings described hereinafter are only some embodiments of the present disclosure, and other drawings may be obtained by those skilled in the art according to those drawings without creative effort.

DETAILED DESCRIPTION

For a better understanding of the embodiments of the present disclosure by those skilled in the art, the technical solutions in the embodiments of the present disclosure are described clearly and completely in conjunction with the drawings in the embodiments of the present disclosure hereinafter. Apparently, the described embodiments are only a part of the embodiments of the disclosure. All the other embodiments obtained by those skilled in the art based on the embodiments of the present disclosure without creative effort will fall within the scope of protection of the disclosure.

Figure 1:
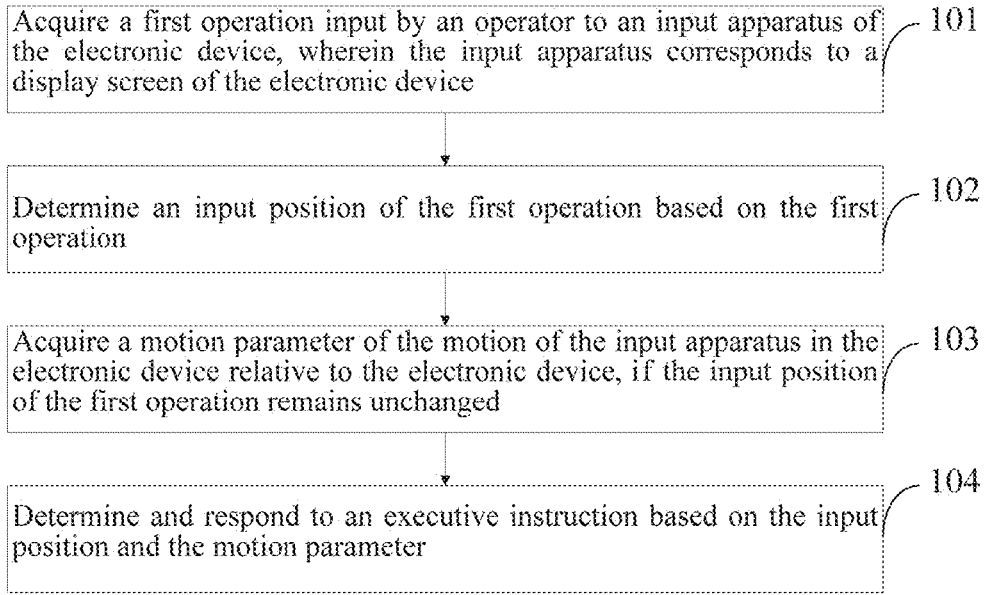
FIG. 1 is a flowchart of a first response control method according to an embodiment of the disclosure.

Reference is made to FIG. 1, which illustrates a response control method applied to an electronic device according to an embodiment of the disclosure. The response control method may include steps 101 to 104.

In step 101, a first operation input by an operator to an input apparatus of the electronic device is acquired, wherein the input apparatus corresponds to a display screen of the electronic device and is on the first body.

It can be understood that the first operation is an operation determined by the electronic device based on a series of sensed operating points when the operator performs an operation on the input apparatus of the electronic device. Different first operations may be obtained by the electronic device based on different operations of the operator.

For example, an operating point may be sensed by the electronic device when the operator performs a click operation on the input apparatus. In this case, the electronic device may determine the first operation to be the click operation based on the operating point. Another example, multiple operating points may be sensed by the electronic device and a line segment is formed by the multiple operating points when the operator performs a sliding operation on the input apparatus. In this case, the electronic device may determine the first operation to be the sliding operation.

Since the input apparatus corresponds to the display screen of the electronic device, an input position on the input apparatus may be converted into a display position on the display screen based on the positional correspondence between the input apparatus and the display screen.

In step 102, an input position of the first operation is determined based on the first operation. A sensing unit may be provided in the input apparatus of the electronic device according to the embodiment of the disclosure. The electronic device may determine the input position of the first operation via the sensing unit when the operator performs the first operation on the input apparatus.

In step 103, a motion parameter of the motion of the input apparatus in the electronic device relative to the electronic device is acquired, in the case where the input position of the first operation remains unchanged.

The input apparatus in the electronic device is set to be a movable part. The input apparatus may move relative to the electronic device under the action of a force from the operator, in the case where the input position of the first operation remains unchanged. At least a one-dimensional motion relative to the electronic device is supported by the input apparatus of the electronic device, such as a motion leftward or rightward. A two-dimensional motion relative to the electronic device may also be performed by the input apparatus of the electronic device, such as a motion upward, downward, leftward and rightward.

The electronic device may sense the motion parameter of the motion of the input apparatus when the input apparatus moves relative to the electronic device. The motion parameter is used to indicate a motion trail of the input apparatus relative to the electronic device, and the motion parameter at least includes a motion direction and duration of the motion.

It should be noted that the motion parameter is acquired in the case where the input position of the first operation remains unchanged, and the electronic device is promoted to stop acquiring the motion parameter when the input position changes.

In step 104, an executive instruction is determined and responded to, based on the input position and the motion parameter.

The motion parameter is used as a key parameter for determining the executive instruction. Different motion parameters correspond to different executive instructions. Besides, the same motion parameter may correspond to different executive instructions for different applications in the electronic device. Correspondences among the motion parameter, the application and the executive instruction are pre-stored in the electronic device. The executive instruction corresponding to the motion parameter for the currently running application is searched from the correspondences once the motion parameter is acquired.

In the case of an electronic map application in the electronic device, the motion direction in the motion parameter corresponds to a zoom instruction in the electronic map, and two opposite motion directions correspond to different zoom instructions. Specifically, the upward motion direction corresponds to a zoom-in instruction, and the downward motion direction corresponds to a zoom-out instruction.

Once the executive instruction is determined based on the motion direction, the electronic device may respond to the executive instruction based on the reference point of the center point of the display screen. In the case where the executive instruction is responded to for the electronic map, the input position may be converted into the display position on the display screen, and the executive instruction is responded to based on the reference point of the display position.

Taking a Word document in the electronic device as an example, the motion direction in the motion parameter corresponds to a copy instruction in the Word document, and two opposite motion directions indicate to execute the copy instruction upward or downward respectively. Specifically, the upward motion direction indicates to copy content in the document upward, and the downward motion direction indicates to copy the content in the document downward. The content in the document are copied based on the reference point of the current display position of a cursor, or the content in the document are copied based on the reference point of the display position on the display screen converted by the input position.

It can be seen from the above description that, in the response control method according to the embodiment of the disclosure, an input position of the first operation for the input apparatus is acquired based on the first operation to the movable input apparatus in the electronic device, a motion parameter of the motion of the input apparatus relative to the electronic device is acquired in the case where the input position of the first operation remains unchanged, and an executive instruction is determined and responded to based on the input position and the motion parameter. In the embodiment of the disclosure, in the case where the movable input apparatus is provided in the electronic device, an operation is performed on the movable input apparatus, instead of operation on the fixed touch screen in the related electronic device, and the executive instruction is determined and responded to based on the first operation to the movable input apparatus.

Compared with the way of triggering the executive instruction in the related technology in which a first operator holds the electronic device and a second operator performs the first operation, the first operation may be performed by a single operator on the movable input apparatus in the electronic device, to trigger the electronic device to respond to the executive instruction, in the response control method according to the embodiment of the disclosure.

Figure 2:
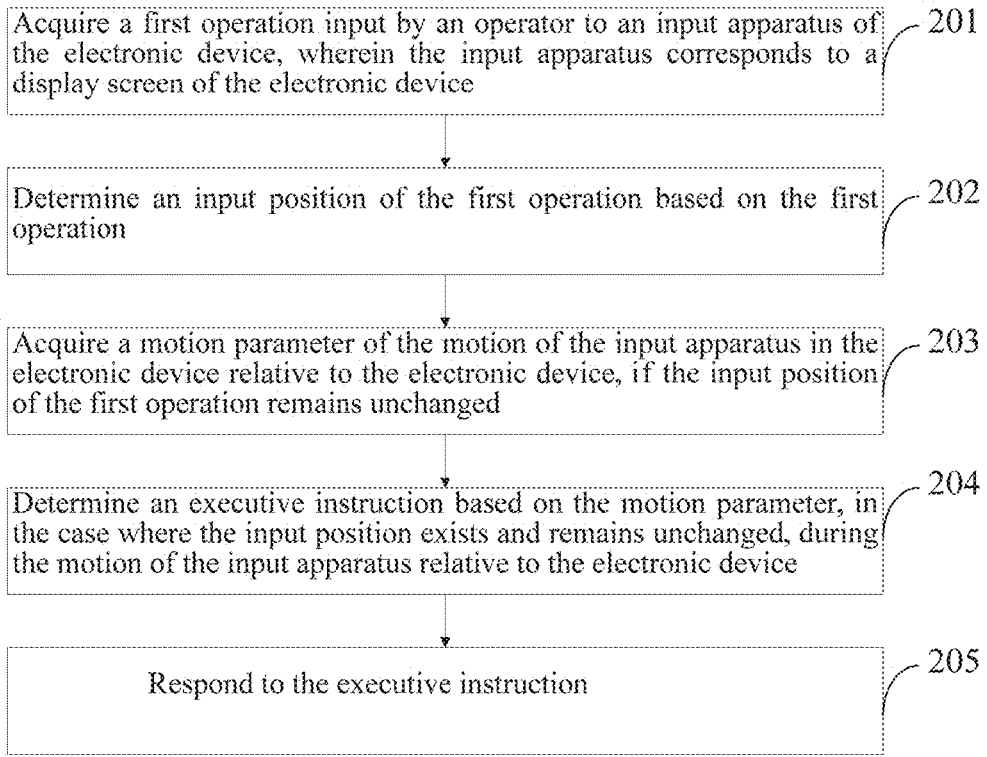
FIG. 2 is a flowchart of a second response control method according to an embodiment of the disclosure.

Reference is made to FIG. 2, which illustrates a flowchart of a response control method according to another embodiment of the disclosure, and a feasible way of determining an executive instruction is introduced. The response control method may include steps 201 to 205.

In step 201, a first operation input by an operator to an input apparatus of the electronic device is acquired, wherein the input apparatus corresponds to a display screen of the electronic device.

In step 202, an input position of the first operation is determined based on the first operation.

In step 203, a motion parameter of the motion of the input apparatus in the electronic device relative to the electronic device is acquired, in the case where the input position of the first operation remains unchanged, wherein at least a one-dimensional motion relative to the electronic device is supported by the input apparatus of the electronic device.

In the embodiment of the disclosure, steps 201 to 203 are the same as steps 101 to 103, which are not set forth in the embodiment of the disclosure.

In step 204, an executive instruction is determined based on the motion parameter, in the case where the input position exists and remains unchanged, during the motion of the input apparatus relative to the electronic device.

The existence of the input position indicates that the operator performs the first operation on the input apparatus continuously, and the input position unchanged may indicate that the operator performs the first operation on the same position in the input apparatus continuously. During the motion of the input apparatus relative to the electronic device, the electronic device determines the executive instruction based on the motion parameter only in the case where the operator performs the first operation on the same position in the input apparatus continuously.

Figure 3:
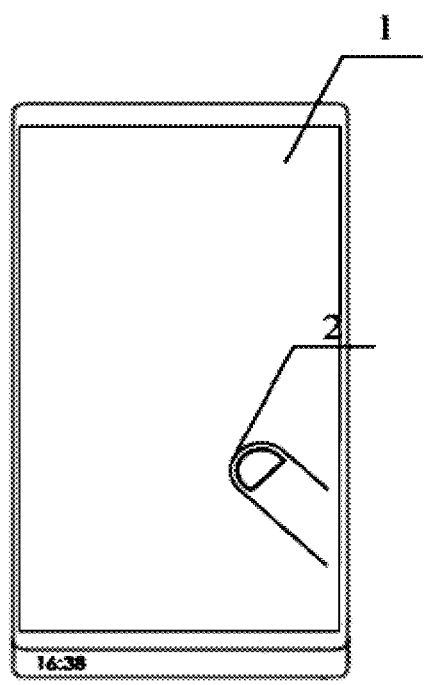
FIG. 3 is a state diagram of an electronic device according to an embodiment of the disclosure.
Figure 4:
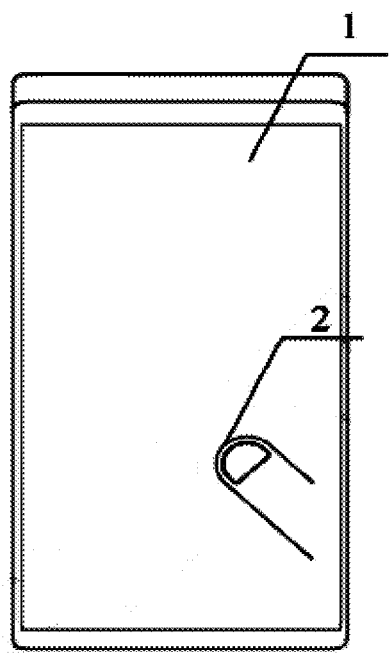
FIG. 4 is a state diagram of an electronic device according to another embodiment of the disclosure.

Taking FIG. 3 as an example, a finger as an operator performs a first operation on an input apparatus 1, and the operating position of the first operation refers to a position 2 where the tip of the finger is contacted with the input apparatus 1, and the operating position may be used as an input position. The input apparatus moves downward relative to the electronic device under the action of the force from the finger. In this case, the input apparatus is changed from the state shown in FIG. 3 to the state as shown in FIG. 4. It can be seen from FIG. 4 that a dialog box originally displayed at the lower in FIG. 3 is covered by the input apparatus during the downward motion of the input apparatus.

During the downward motion of the input apparatus relative to the electronic device, the tip of the finger is contacted with the input apparatus 1 continuously, and the contacted position between the both is still the position 2 where the tip of the finger is initially contacted with the input apparatus. That is to say, the input position exists and remains unchanged during the motion of the input apparatus relative to the electronic device. In this case, the acquired motion parameter includes the motion direction, and the motion direction indicates to move downward.

Assumed that the application currently running in the electronic device is the electronic map, the downward motion direction corresponds to a zoom-out instruction, and the upward motion direction corresponds to a zoom-in instruction.

In step 205, the executive instruction is responded to. Once the executive instruction is determined based on the motion direction, the electronic device may respond to the executive instruction based on the reference point of the center point of the display screen. In the case where the executive instruction is responded to for the electronic map, the input position may be converted into the display position on the display screen, and the executive instruction is responded to based on the reference point of the display position.

Figure 5:
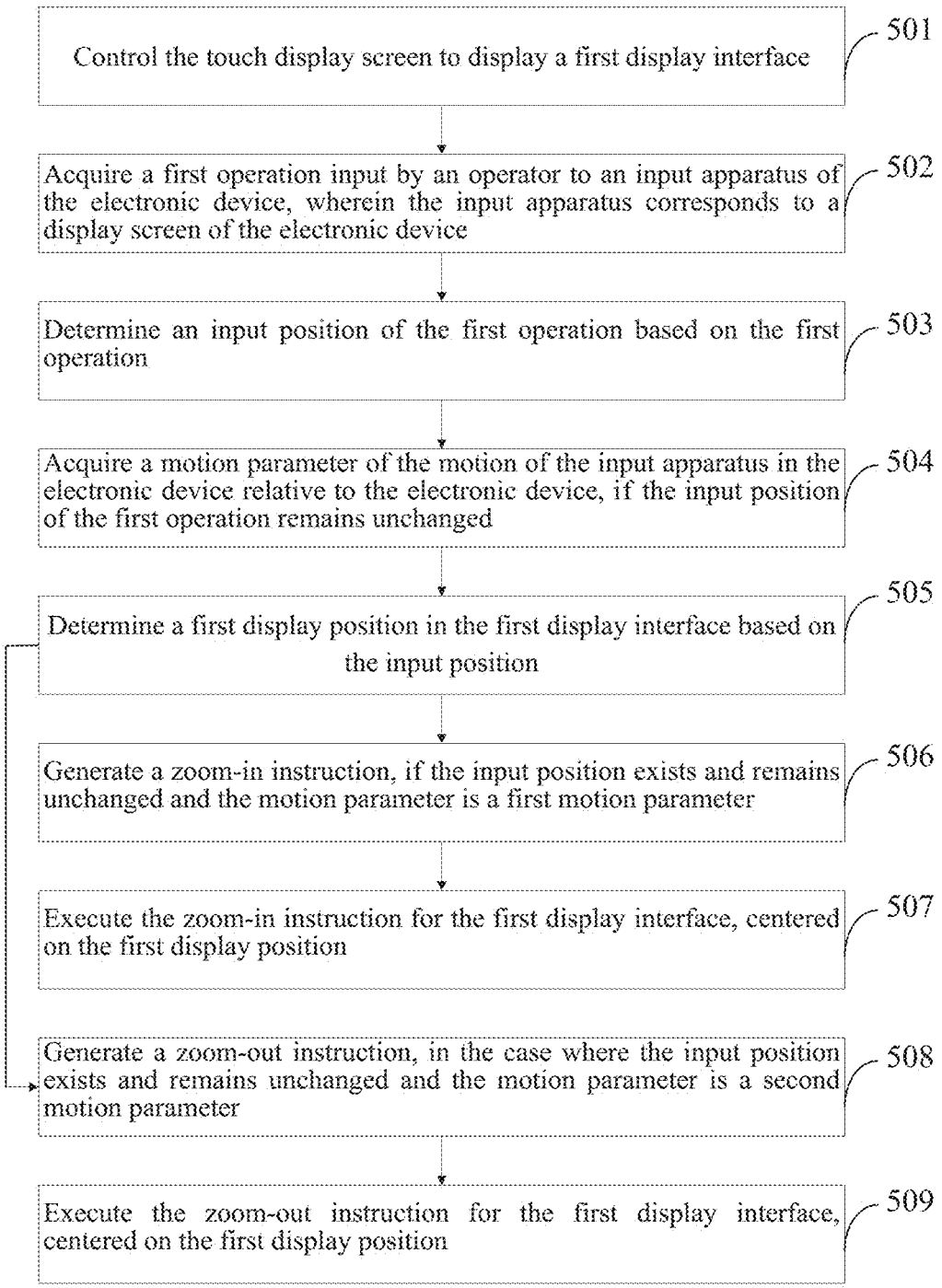
FIG. 5 is a flowchart of a third response control method according to an embodiment of the disclosure.

With respect to FIG. 3 and FIG. 4, the input apparatus is a touch display screen, the touch display screen includes a touch-sensitive layer and the display screen, and a sensing unit in the touch-sensitive layer corresponds to a display unit in the display screen. The sensing unit may determine an input position of a first operation based on the first operation, and the input position may be converted into the display position in the display unit. For the electronic devices as shown in FIG. 3 and FIG. 4, a flowchart of a response control method according to an embodiment of the disclosure may include steps 501 to 509, as shown in FIG. 5.

In step 501, the touch display screen is controlled to display a first display interface. The content displayed on the first display interface is the content of the currently running application in the electronic device. In the response control method according to the embodiment of the disclosure, the displayed content is processed once the first operation is acquired.

In step 502, the first operation input by an operator to an input apparatus of the electronic device is acquired, wherein the input apparatus corresponds to the display screen of the electronic device.

In step 503, an input position of the first operation is determined based on the first operation.

In the embodiment of the disclosure, step 502 and step 503 are the same as step 101 and step 102, which are not set forth in the embodiment of the disclosure.

In step 504, a motion parameter of the motion of the input apparatus in the electronic device relative to the electronic device is acquired, in the case where the input position of the first operation remains unchanged.

The input apparatus in the electronic device is configured to be a movable part. The input apparatus may move relative to the electronic device under the action of a force from the operator, in the case where the input position of the first operation remains unchanged. At least a one-dimensional motion relative to the electronic device is supported by the input apparatus of the electronic device, such as a motion leftward or rightward. A two-dimensional motion relative to the electronic device may also be performed by the input apparatus of the electronic device, such as a motion upward, downward, leftward and rightward.

The electronic device may sense the motion parameter of the motion of the input apparatus when the input apparatus moves relative to the electronic device. The motion parameter is used to indicate a motion trail of the input apparatus relative to the electronic device, and the motion parameter at least includes a motion direction and duration of the motion.

In the embodiment of the disclosure, a Hall element is provided at the position where the input apparatus is contacted to the electronic device, and the electronic device detects variation in magnetic flux on the Hall element to indicate a motion displacement of the input apparatus relative to the electronic device. The motion displacement may indicate a motion parameter of the motion direction, and the respective duration refers to the duration after the magnetic flux is changed to a fixed amount.

It should be noted that the motion parameter is acquired in the case where the input position of the first operation remains unchanged, and the electronic device is promoted to stop acquiring the motion parameter when the input position changes.

In step 505, a first display position in the first display interface is determined based on the input position. Based on the input position, the input position is converted to be the first display position in the first display interface via a sensing unit, to determine the position on the displayed content at which the current first operation is performed.

In step 506, a zoom-in instruction is generated, in the case where the input position exists and remains unchanged and the motion parameter is a first motion parameter. In the embodiment of the disclosure, the first motion parameter may refer to a downward motion direction which corresponds to the zoom-in instruction. The zoom-in instruction corresponding to the first motion parameter is generated in the case where the electronic device determines that the motion parameter is the first motion parameter.

A magnification may be determined based on the movement distance relative to a center in the downward motion, and the magnification is greater if the distance is larger, where the center is a point at which the input apparatus not having been operated is located originally. Once it is detected that the magnetic flux is changed to the fixed amount, the duration for the fixed amount in the first motion parameter is acquired, and the magnification is determined based on the duration. The magnification is greater if the duration is longer, and there is a time interval among the magnifications under different levels.

In step 507, the zoom-in instruction is executed for the first display interface, centered on the first display position.

In step 508, a zoom-out instruction is generated, in the case where the input position exists and remains unchanged and the motion parameter is a second motion parameter. Correspondingly, the second motion parameter may refer to an upward motion direction which corresponds to the zoom-out instruction. The zoom-out instruction corresponding to the second motion parameter is generated in the case where the electronic device determines that the motion parameter is the second motion parameter.

A minification may be determined based on the movement distance relative to the center in the upward motion, and the minification is greater if the distance is larger, where the center is the point at which the input apparatus not having been operated is located originally. Once it is detected that the magnetic flux is changed to the fixed amount, the duration for the fixed amount in the second motion parameter is acquired, and the minification is determined based on the duration. The minification is greater if the duration is longer, and there is a time interval among the minifications under different levels.

In the embodiment of the disclosure, the way of replacing the first motion parameter with the second motion parameter or replacing the second motion parameter with the first motion parameter includes but is not limited to two ways as follows.

In one way, the electronic device detects the variation in magnetic flux on the Hall element, and the motion parameter of the input apparatus is replaced in the case where the variation in magnetic flux indicates that the motion displacement of the input apparatus changes relative to the electronic device.

In another way, the center point in the case where the input apparatus is in the original state is mapped into the electronic device, the electronic device may determine whether the motion displacement of the input apparatus changes relative to the electronic device by detecting the variation in magnetic flux, and may determine whether the motion displacement passes through the center point based on the change of the motion displacement. The motion parameter of the input apparatus is replaced in the case where the motion displacement of the input apparatus changes and the motion displacement passes through the center.

In step 509, the zoom-out instruction is executed for the first display interface, centered on the first display position.

The zoom-in instruction is an instruction obtained based on the first motion parameter in the case where the input position exists and remains unchanged, that is, the operator performs the first operation at the same position on the touch display screen continuously, as shown in FIG. 3 and FIG. 4. In the case where the first operation remains unchanged, the electronic device acquires the motion parameter of the motion of the touch display screen relative to the electronic device, and the zoom-in instruction is generated in the case where the motion parameter is the first motion parameter, or the zoom-out instruction is generated in the case where the motion parameter is the second motion parameter.

In the embodiment of the disclosure, the motion parameter may include the motion direction, and it is determined based on the motion direction to generate a specific executive instruction. For example, the downward motion direction is to generate the zoom-in instruction, and the upward motion direction is to generate the zoom-out instruction. Once the respective executive instruction is obtained, the converted first display position is taken as a center, that is, the respective executive instruction is performed on the displayed content on the first display interface in the case where the content displayed on the first display position remains unchanged.

The touch display screen moves relative to the electronic device under the action of the force from the operator, in the case where the input position exists and remains unchanged.

In this case, with the response control method according to the embodiment of the disclosure, the motion parameter may be acquired continuously and a multiple of response is determined based on the duration of acquiring the motion parameter continuously, and the respective executive instruction may be performed on the displayed content on the first display interface, centered on the first display position and according to the multiple of response. The multiple of response becomes greater as the duration is continuously increased, and thus the operation on the first display interface may be completed as soon as possible by increasing the multiple of response.

Figure 6:
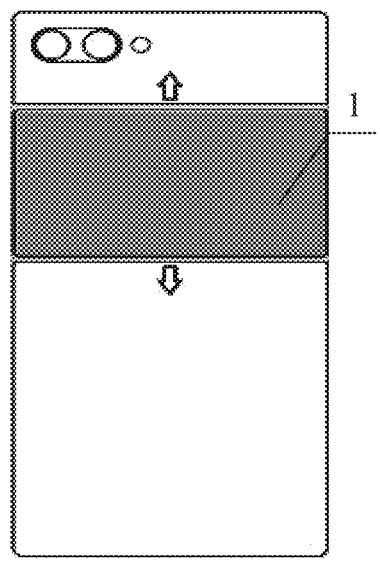
FIG. 6 is a schematic diagram of an input apparatus in an electronic device according to an embodiment of the disclosure.
Figure 7:
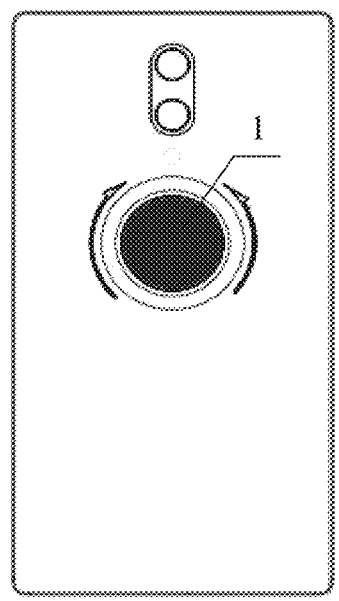
FIG. 7 is a schematic diagram of an input apparatus in an electronic device according to another embodiment of the disclosure.

In the embodiment of the disclosure, besides the touch display screen as shown in FIG. 3 and FIG. 4, other forms may also be used for the input apparatus. As shown in FIG. 6 and FIG. 7, a movable input apparatus is provided on the back surface of the electronic device, and the input apparatus is movable relative to the electronic device. For example, the input apparatus 1 is movable upward or downward relative to the electronic device in the electronic device as shown in FIG. 6, and the input apparatus 1 is rotatable clockwise or anti-clockwise relative to the electronic device in FIG. 7.

Figure 8:
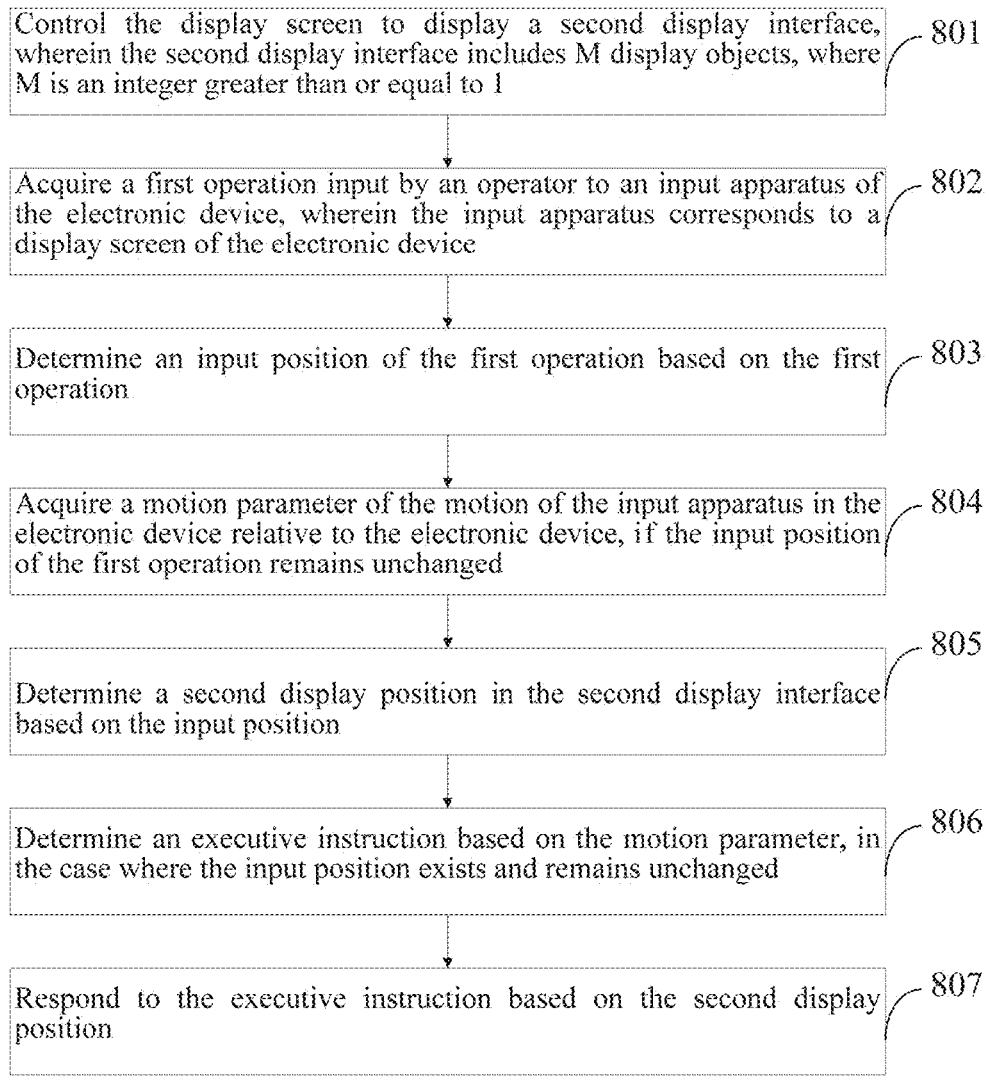
FIG. 8 is a flowchart of a fourth response control method according to an embodiment of the disclosure.

For the electronic devices with such two structures, a response control method according to an embodiment of the disclosure may include steps 801 to 807, as shown in FIG. 8.

In step 801, the display screen is controlled to display a second display interface, wherein the second display interface includes M display objects, where M is an integer greater than or equal to 1, and an input unit in the input apparatus corresponds to a display unit in the display screen.

The display object on the second display interface is the content in the application currently running in the electronic device. With the response control method according to the embodiment of the disclosure, the display object is processed once a first operation is obtained. The display object is determined depending on the current running application. For example, the display object may be words in the Word document, or a character or a control in a current running game.

The input unit may determine an input position of the first operation based on the first operation. The input position may be converted into a display position of the display unit. In the embodiment of the disclosure, the input apparatus may be a touch control, the input unit may be a sensing unit in the touch control, and the input position of the first operation is determined by sensing the first operation.

In step 802, the first operation input by an operator to the input apparatus of the electronic device is acquired, wherein the input apparatus corresponds to the display screen of the electronic device.

In step 803, the input position of the first operation is determined based on the first operation. In the embodiment of the disclosure, step 802 and step 803 are the same as step 101 and step 102, which are not set forth in the embodiment of the disclosure.

In step 804, a motion parameter of the motion of the input apparatus in the electronic device relative to the electronic device is acquired, in the case where the input position of the first operation remains unchanged.

The input apparatus in the electronic device is configured to be a movable part. The input apparatus may move relative to the electronic device under the action of a force from the operator, in the case where the input position of the first operation remains unchanged. At least a one-dimensional motion relative to the electronic device is supported by the input apparatus of the electronic device, such as a motion leftward or rightward. A two-dimensional motion relative to the electronic device may also be performed by the input apparatus of the electronic device, such as a motion upward, downward, leftward and rightward.

The electronic device may sense the motion parameter of the motion of the input apparatus when the input apparatus moves relative to the electronic device. The motion parameter is used to indicate a motion trail of the input apparatus relative to the electronic device, and the motion parameter at least includes a motion direction and duration of the motion.

In the embodiment of the disclosure, the electronic device is provided with a groove configured to install the input apparatus, and touch-control points are provided on at least two opposite edges of the groove. The two opposite edges are determined depending on the motion direction of the input apparatus relative to the electronic device. For example, the two opposite edges refer to the upper and lower edges of the groove in the case where the input apparatus moves upward or downward relative to the electronic device.

The input apparatus moves relative to the electronic device under the action of the first operation. When the input apparatus touches the touch-control points, the change of the electrical level on the touch-control points is detected by the electronic device. In this case, the electronic device may determine the motion direction of the input apparatus based on the touch-control points on which the electrical level changes, and the duration of the change of the electrical level on the touch-control points is used as the duration in the motion parameter. The multiple of response for the executive instruction may be determined based on the length of the duration, and the multiple of response is greater if the duration is longer.

It should be noted that the motion parameter is acquired in the case where the input position of the first operation remains unchanged, and the electronic device is promoted to stop acquiring the motion parameter when the input position changes.

In step 805, a second display position in the second display interface is determined based on the input position. Based on the input position, the input position is converted to be the second display position in the second display interface via the input unit, to determine the display object on which the current first operation is performed.

In step 806, the executive instruction is determined based on the motion parameter, in the case where the input position exists and remains unchanged.

The existence of the input position indicates that the operator performs the first operation on the input apparatus continuously, and the input position being unchanged may indicate that the operator performs the first operation on the same position in the input apparatus continuously. That is, during the motion of the input apparatus relative to the electronic device, the electronic device determines the executive instruction based on the motion parameter only in the case where the operator performs the first operation on the same position in the input apparatus continuously.

The motion parameter is used as a key parameter for determining the executive instruction. Different motion parameters correspond to different executive instructions. Besides, the same motion parameter may correspond to different executive instructions for different applications in the electronic device. Specifically, correspondences among the motion parameter, the application and the executive instruction are pre-stored in the electronic device. The executive instruction corresponding to the motion parameter for the currently running application is searched from the correspondences once the motion parameter is acquired.

In step 807, the executive instruction is responded to, based on the second display position. In the embodiment of the disclosure, the ways of responding to the executive instruction may include but be not limited to the following ways.

In a first way, the executive instruction is responded to, centered on the second display position, for which the specific details may be referred to the respective description in the flowchart as shown in FIG. 5.

In a second way, firstly the first display object corresponding to the second display position on the second display interface is determined, to acquire the first display object on which the first operation is performed; secondly, a movement instruction corresponding to a motion direction of the motion of the input apparatus in the electronic device relative to the electronic device is generated based on the motion direction; and then the movement instruction is responded to, wherein the movement instruction is used to change a relative position of the first display object in the second display interface based on the motion direction.

The motion direction is a parameter in the motion parameter, and the motion direction may be used as a movement direction in the movement instruction. In the case where a relative position of the first display object in the second display interface is changed by responding to the movement instruction, the movement instruction may be performed on the first display object to change the position of the first display object in the second display interface, thereby changing the relative position of the first display object in the second display interface. The movement instruction may be performed on the second display interface when the movement instruction is responded to. In this case, the position of the first display object in the display screen remains unchanged, and the displayed content on the second display interface in the display screen may be changed in response to the movement instruction, thereby changing the relative position of the first display object in the second display interface.

A third way is mainly applied to the case that the display object on the second display interface is a word, the specific process may be described as follows. A display object selecting instruction corresponding to a motion direction of the motion of the input apparatus in the electronic device relative to the electronic device is generated based on the second display position and the motion direction; and then the display object selecting instruction is responded to, wherein the display object selecting instruction is used to select a plurality of display objects during the motion of the input apparatus of the electronic device relative to the electronic device from the second display position.

Figure 9:
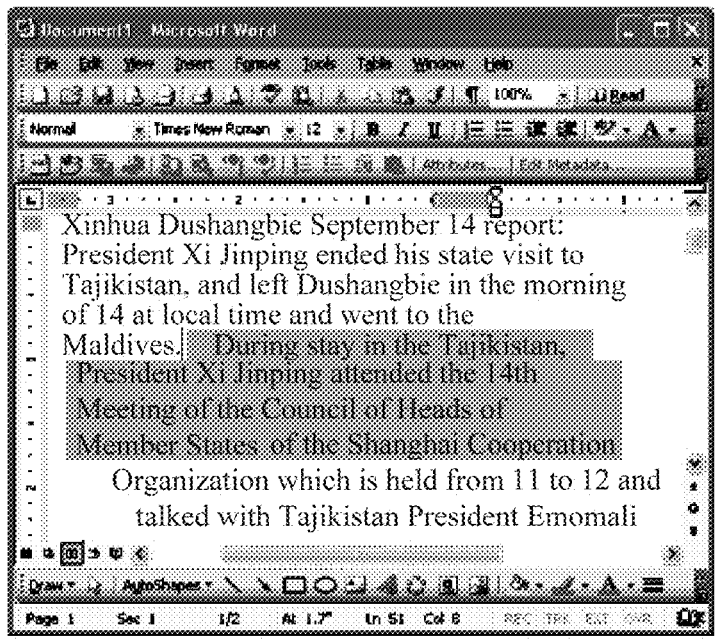
FIG. 9 is a schematic diagram of response of an executive instruction according to an embodiment of the disclosure.

As shown in FIG. 9, the position of the cursor (a black line segment) shown in FIG. 9 is the second display position. In the case where the input apparatus moves downward relative to the electronic device, the electronic device start to select the words (the display object) displayed on the second display interface from the second display position downward. In the case where the motion of the input apparatus relative to the electronic device is ended, the selection of the words is ended, thereby completing the process of executing the display object selecting instruction.

In the above embodiment, it is introduced that the process of determining and responding to the executive instruction based on the input position and the motion parameter of the motion of the input apparatus relative to the electronic device in the case where the input position of the first operation remains unchanged. It should be noted that the executive instruction is determined and responded to in the case where the input position exists and remains unchanged in some embodiments, while the electronic device does not determine and respond to the executive instruction based on the input position and the motion parameter in the case where it is detected that there is no input position or the input position is changed.

After the response of the executive instruction is ended, the response control method according to the embodiment of the disclosure may further control the input apparatus to be reset, that is, recover the input apparatus to be an original state. As shown in FIG. 3 and FIG. 4, the original state of the input apparatus is shown in FIG. 3, the input apparatus moves into the state shown in FIG. 4 relative to the electronic device, and the input apparatus is recovered to be the original state shown in FIG. 3 after the response of the executive instruction is ended.

Figure 10:
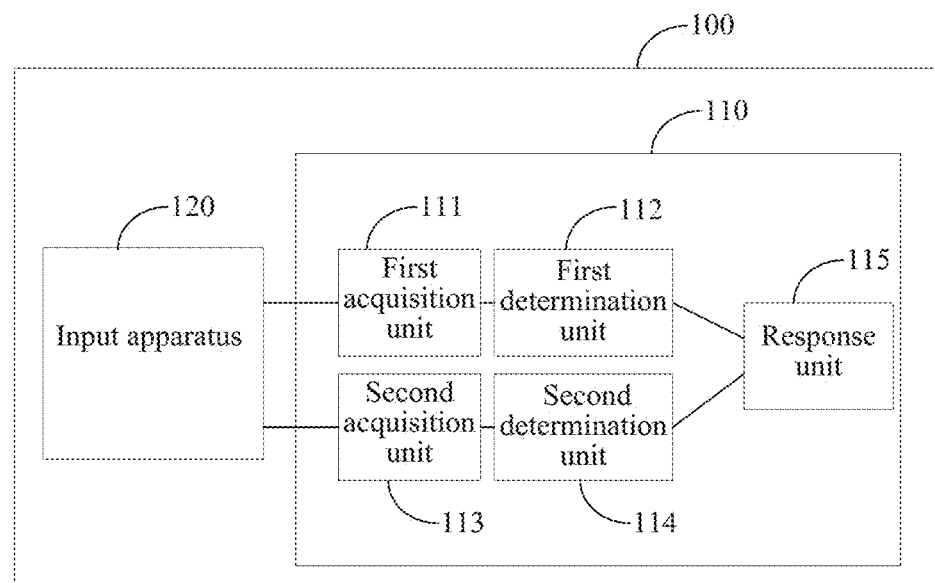
FIG. 10 is a schematic structural diagram of an electronic device according to an embodiment of the disclosure.

Corresponding to the embodiments of the method described above, an electronic device is further provided according to an embodiment of the disclosure, of which the schematic structural diagram may be shown in FIG. 10. The electronic device 100 includes: a response control apparatus 110 and a movable input apparatus 120 located on the electronic device 100. The response control apparatus 110 includes a first acquisition unit 111, a first determination unit 112, a second acquisition unit 113, a second determination unit 114 and a response unit 115. It should be appreciated that the response control apparatus 110, the first acquisition unit 111, the first determination unit 112, the second acquisition unit 113, the second determination unit 114 and the response unit 115 may constitute one or more processors.

The first acquisition unit 111 is configured to acquire a first operation input by an operator to an input apparatus of the electronic device, wherein the input apparatus corresponds to a display screen of the electronic device.

It can be understood that the first operation is an operation determined by the electronic device based on a series of sensed operating points when the operator performs an operation on the input apparatus of the electronic device. Different first operations may be obtained by the electronic device based on different operations of the operator.

For example, one operating point may be sensed by the first acquisition unit 111 when the operator performs a click operation on the input apparatus. In this case, the first acquisition unit 111 may determine the first operation to be the click operation based on the operating point. Another example, multiple operating points may be sensed by the first acquisition unit 111 and a line segment is formed by the multiple operating points when the operator performs a sliding operation on the input apparatus. In this case, the first acquisition unit 111 may determine the first operation to be the sliding operation.

Since the input apparatus corresponds to the display screen of the electronic device, an input position on the input apparatus may be converted into a display position on the display screen based on the positional correspondence between the input apparatus and the display screen.

The first determination unit 112 is configured to determine an input position of the first operation based on the first operation. A sensing unit may be provided in the input apparatus of the electronic device according to the embodiment of the disclosure. The sensing unit is the first determination unit 112. The electronic device may determine the input position of the first operation via the sensing unit when the operator performs the first operation on the input apparatus.

The second acquisition unit 113 is configured to acquire a motion parameter of the motion of the input apparatus in the electronic device relative to the electronic device, in the case where the input position of the first operation remains unchanged.

The input apparatus in the electronic device is configured to be a movable part. The input apparatus may move relative to the electronic device under the action of a force from the operator, in the case where the input position of the first operation remains unchanged. At least a one-dimensional motion relative to the electronic device is supported by the input apparatus of the electronic device, such as a motion leftward or rightward. A two-dimensional motion relative to the electronic device may also be performed by the input apparatus of the electronic device, such as a motion upward, downward, leftward and rightward.

The second acquisition unit 113 may sense the motion parameter of the motion of the input apparatus when the input apparatus moves relative to the electronic device. The motion parameter is used to indicate a motion trail of the input apparatus relative to the electronic device, and the motion parameter at least includes a motion direction and duration of the motion.

It should be noted that the motion parameter is acquired in the case where the input position of the first operation remains unchanged, and the second acquisition unit 113 is promoted to stop acquiring the motion parameter when the input position changes.

The second determination unit 114 is configured to determine an executive instruction based on the input position and the motion parameter, wherein different motion parameters correspond to different executive instructions. The response unit 115 is configured to respond to the executive instruction.

The motion parameter is used as a key parameter for determining the executive instruction. Different motion parameters correspond to different executive instructions. Besides, the same motion parameter may correspond to different executive instructions for different applications in the electronic device. Correspondences among the motion parameter, the application and the executive instruction are pre-stored in the electronic device. The executive instruction corresponding to the motion parameter for the currently running application is searched by the second determination unit 114 from the correspondences once the motion parameter is acquired.

In the case of an electronic map application in the electronic device, the motion direction in the motion parameter corresponds to a zoom instruction in the electronic map, and two opposite motion directions correspond to different zoom instructions. Specifically, the upward motion direction corresponds to a zoom-in instruction, and the downward motion direction corresponds to a zoom-out instruction.

Once the executive instruction is determined based on the motion direction, the response unit 115 may respond to the executive instruction based on the reference point of the center point of the display screen. In the case where the executive instruction is responded to for the electronic map, the input position may be converted into the display position on the display screen, and the response unit 115 responds to the executive instruction based on the reference point of the display position.

It can be seen from the above description that, in the response control method according to the embodiment of the disclosure, an input position of the first operation for the input apparatus is acquired based on the first operation to the movable input apparatus in the electronic device, a motion parameter of the motion of the input apparatus relative to the electronic device is acquired in the case where the input position of the first operation remains unchanged, and an executive instruction is determined and responded to based on the input position and the motion parameter. In the embodiment of the disclosure, in the case where the movable input apparatus is provided in the electronic device, an operation is performed on the movable input apparatus, instead of operation on the fixed touch screen in the related electronic device, and the executive instruction is determined and responded to based on the first operation to the movable input apparatus.

Compared with the way of triggering the executive instruction in the related technology in which a first operator holds the electronic device and a second operator performs the first operation, the first operation may be performed by a single operator on the movable input apparatus in the electronic device, to trigger the electronic device to respond to the executive instruction, in the response control method according to the embodiment of the disclosure.

The process of determining by the second determination unit 114 the above an executive instruction based on the input position and the motion parameter may include: determining the executive instruction based on the motion parameter, in the case where the input position exists and remains unchanged, during the motion of the input apparatus of the electronic device relative to the electronic device.

The existence of the input position indicates that the operator performs the first operation on the input apparatus continuously, and the input position being unchanged may indicate that the operator performs the first operation on the same position in the input apparatus continuously. During the motion of the input apparatus relative to the electronic device, the electronic device determines the executive instruction based on the motion parameter only in the case where the operator performs the first operation on the same position in the input apparatus continuously.

Taking FIG. 3 as an example, a finger as an operator performs a first operation on an input apparatus 1, and the operating position of the first operation refers to a position 2 where the tip of the finger is contacted with the input apparatus 1, and the operating position may be used as an input position. The input apparatus moves downward relative to the electronic device under the action of the force from the finger. In this case, the input apparatus is changed from the state as shown in FIG. 3 to the state as shown in FIG. 4.

During the downward motion of the input apparatus relative to the electronic device, the tip of the finger is contacted with the input apparatus 1 continuously, and the contacted position between the both is still the position 2 where the tip of the finger is initially contacted with the input apparatus. That is to say, the input position exists and remains unchanged during the motion of the input apparatus relative to the electronic device. In this case, the acquired motion parameter includes the motion direction, and the motion direction indicates to move downward.

Assumed that the application currently running in the electronic device is the electronic map, the downward motion direction corresponds to a zoom-out instruction, and the upward motion direction corresponds to a zoom-in instruction.

In the electronic devices as shown in FIG. 3 and FIG. 4, the input apparatus 120 is a touch display screen, the touch display screen includes a touch-sensitive layer and the display screen, and a sensing unit in the touch-sensitive layer corresponds to a display unit in the display screen.

The electronic device 100 further includes a control apparatus configured to control the touch display screen to display a first display interface. The content displayed on the first display interface is the content of the currently running application in the electronic device. In the response control method according to the embodiment of the disclosure, the displayed content is processed once the first operation is acquired.

Figure 11:
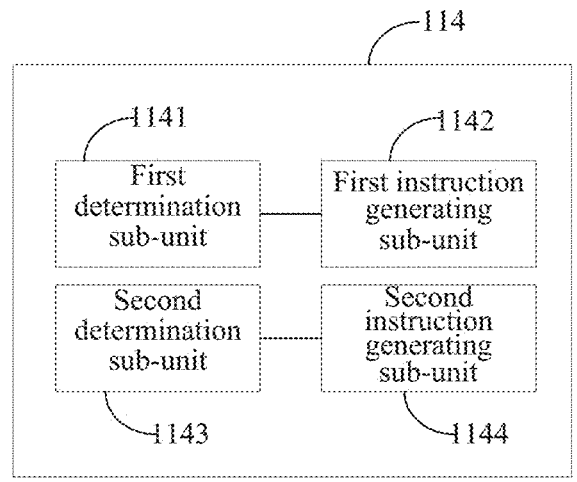
FIG. 11 is a schematic structural diagram of a second determination unit in an electronic device according to an embodiment of the disclosure.

For the electronic devices as shown in FIG. 3 and FIG. 4, a schematic structural diagram of the second determination unit 114 includes a first determination sub-unit 1141, a first instruction generating sub-unit 1142, a second determination sub-unit 1143 and a second instruction generating sub-unit 1144, as shown in FIG. 11.

The first determination sub-unit 1141 is configured to determine a first display position in the first display interface based on the input position.

The first instruction generating sub-unit 1142 is configured to generate a zoom-in instruction, in the case where the input position exists and remains unchanged and the motion parameter is a first motion parameter, and trigger the response unit 115 to execute the zoom-in instruction for the first display interface, centered on the first display position.

The second determination sub-unit 1143 is configured to determine a first display position in the first display interface based on the input position.

The second instruction generating sub-unit 1144 is configured to generate a zoom-out instruction, in the case where the input position exists and remains unchanged and the motion parameter is a second motion parameter, and trigger the response unit 115 to execute the zoom-out instruction for the first display interface, centered on the first display position.

The zoom-in instruction is an instruction obtained based on the first motion parameter in the case where the input position exists and remains unchanged, that is, the operator performs the first operation at the same position on the touch display screen continuously, as shown in FIG. 3 and FIG. 4. In the case where the first operation remains unchanged, the electronic device acquires the motion parameter of the motion of the touch display screen relative to the electronic device, and the zoom-in instruction is generated in the case where the motion parameter is the first motion parameter, or the zoom-out instruction is generated in the case where the motion parameter is the second motion parameter.

In the embodiment of the disclosure, the motion parameter may include the motion direction, and it is determined based on the motion direction to generate what executive instruction. For example, the downward motion direction corresponds to the zoom-in instruction, and the upward motion direction corresponds to the zoom-out instruction. Once the respective executive instruction is obtained, the converted first display position is taken as a center, that is, the response unit 115 performs the respective executive instruction on the displayed content on the first display interface in the case where the content displayed on the first display position remains unchanged.

Figure 12:
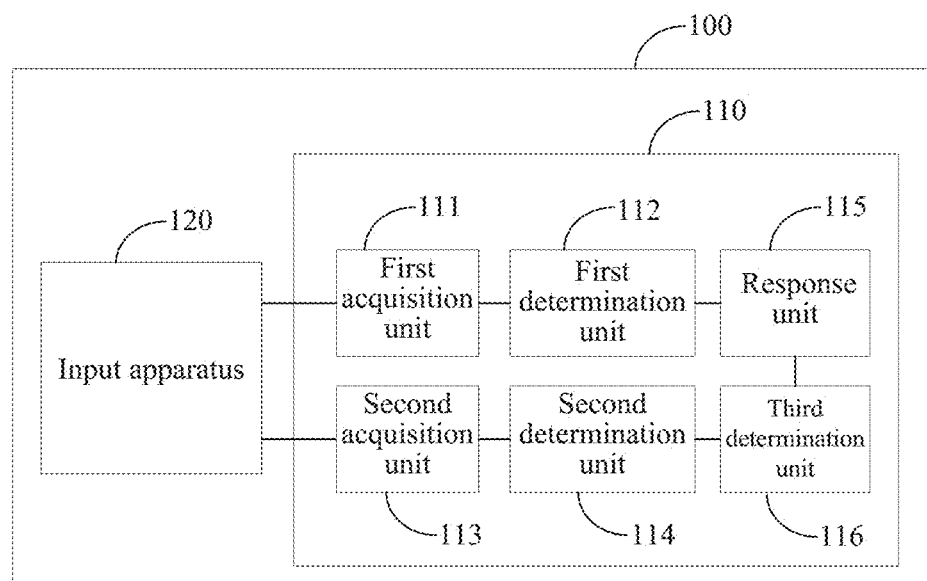
FIG. 12 is a schematic structural diagram of a second electronic device according to an embodiment of the disclosure.

The touch display screen moves relative to the electronic device under the action of the force from the operator, in the case where the input position exists and remains unchanged. In this case, the response control apparatus according to the embodiment of the disclosure may further include a third determination unit 116, as shown in FIG. 12.

The third determination unit 116 is configured to acquire a motion parameter and determine a multiple of response based on the duration of acquiring the motion parameter continuously. In this case, the response unit 115 may perform the respective executive instruction on the displayed content on the first display interface, centered on the first display position and according to the multiple of response. The multiple of response becomes greater as the duration is continuously increased, and thus the operation on the first display interface may be completed as soon as possible by increasing the multiple of response.

Figure 13:
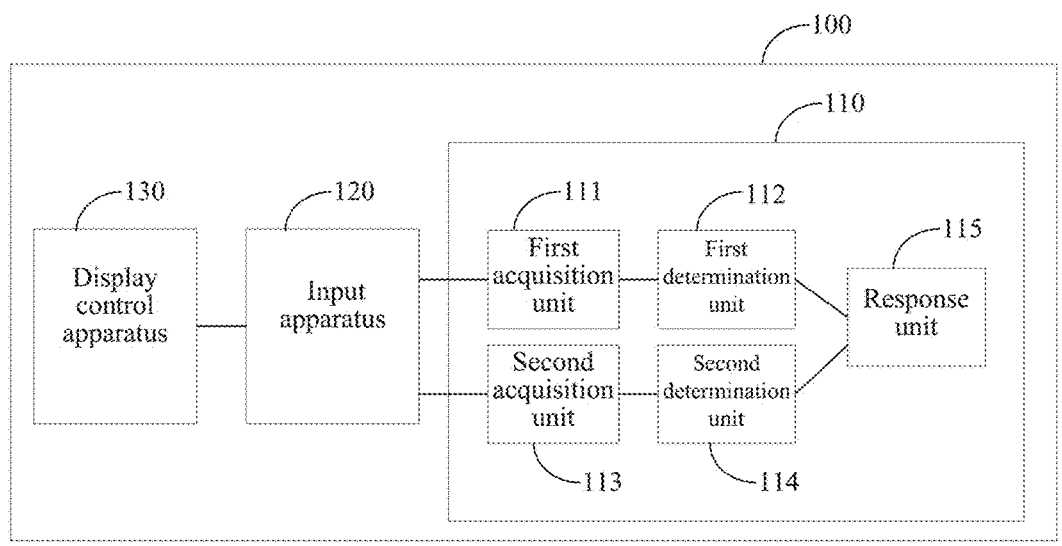
FIG. 13 is a schematic structural diagram of a third electronic device according to an embodiment of the disclosure.

Reference is made to FIG. 13, which illustrates a schematic structural diagram of a third electronic device according to an embodiment of the disclosure. On the basis of FIG. 10, the electronic device further includes a display control apparatus 130 configured to control the display screen to display a second display interface. The second display interface includes M display objects, where M is an integer greater than or equal to 1, and an input unit in the input apparatus corresponds to a display unit in the display screen.

In the embodiment of the disclosure, the display object on the second display interface is the content in the application currently running in the electronic device. The display object is processed by the electronic device once the first operation is obtained. The display object is determined depending on the current running application. For example, the display object may be words in the Word document, or a character or a control in a current running game.

The input unit may determine an input position of the first operation based on the first operation. The input position may be converted into a display position of the display unit.

In the embodiment of the disclosure, the input apparatus may be a touch control, the input unit may be a sensing unit in the touch control, and the input position of the first operation is determined by sensing the first operation.

Figure 14:
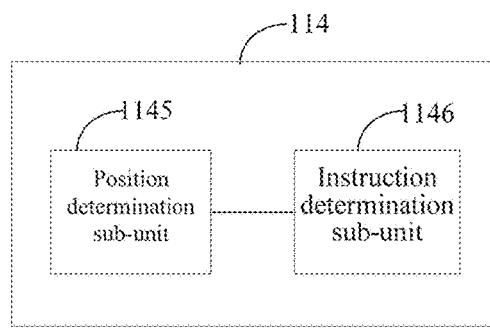
FIG. 14 is a schematic structural diagram of a second determination unit in an electronic device according to another embodiment of the disclosure.

The second determination unit 114 may include a position determination sub-unit 1145 and an instruction determination sub-unit 1146, as shown in FIG. 14. The position determination sub-unit 1145 is configured to determine a second display position in the second display interface based on the input position.

The instruction determination sub-unit 1146 is configured to determine the executive instruction based on the motion parameter, and trigger the response unit to respond to the executive instruction based on the second display position, in the case where the input position exists and remains unchanged.

It can be understood that the existence of the input position indicates that the operator performs the first operation on the input apparatus continuously, and the input position unchanged may indicate that the operator performs the first operation on the same position in the input apparatus continuously. During the motion of the input apparatus relative to the electronic device, the instruction determination sub-unit 1146 determines the executive instruction based on the motion parameter only in the case where the operator performs the first operation on the same position in the input apparatus continuously.

The motion parameter is used as a key parameter for determining the executive instruction. Different motion parameters correspond to different executive instructions. Besides, the same motion parameter may correspond to different executive instructions for different applications in the electronic device. Correspondences among the motion parameter, the application and the executive instruction are pre-stored in the instruction determination sub-unit 1146. The executive instruction corresponding to the motion parameter for the currently running application is searched from the correspondences once the motion parameter is acquired.

Figure 15:
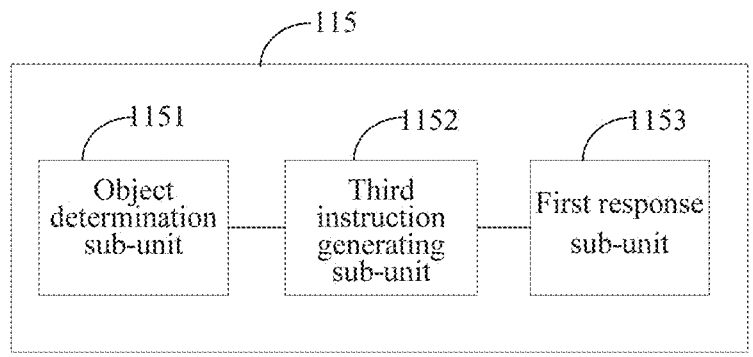
FIG. 15 is a schematic structural diagram of a response unit in an electronic device according to an embodiment of the disclosure.

In this case, a schematic structural diagram of the response unit 115 includes an object determination sub-unit 1151, a third instruction generating sub-unit 1152 and a first response sub-unit 1153, as shown in FIG. 15.

The object determination sub-unit 1151 is configured to determine a first display object corresponding to the second display position in the second display interface.

The third instruction generating sub-unit 1152 is configured to generate a movement instruction corresponding to a motion direction of the motion of the input apparatus in the electronic device relative to the electronic device, based on the motion direction.

The first response sub-unit 1153 is configured to respond to the movement instruction to change a relative position of the first display object in the second display interface based on the motion direction.

The motion direction is a parameter in the motion parameter, and the motion direction may be used as a movement direction in the movement instruction. In the case where the first response sub-unit 1153 changes a relative position of the first display object in the second display interface by responding to the movement instruction, the movement instruction may be performed on the first display object to change the position of the first display object in the second display interface, thereby changing the relative position of the first display object in the second display interface. The first response sub-unit 1153 may perform the movement instruction on the second display interface when the movement instruction is responded to. In this case, the position of the first display object in the display screen remains unchanged, and the displayed content on the second display interface in the display screen may be changed in response to the movement instruction, thereby changing the relative position of the first display object in the second display interface.

Figure 16:
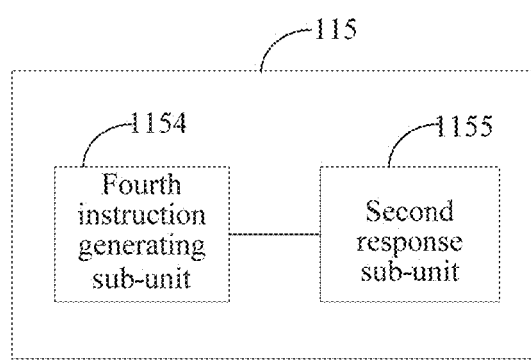
FIG. 16 is a schematic structural diagram of a response unit in an electronic device according to another embodiment of the disclosure.

Another schematic structural diagram of the response unit 115 includes a fourth instruction generating sub-unit 1154 and a second response sub-unit 1155, as shown in FIG. 16.

The fourth instruction generating sub-unit 1154 is configured to generate a display object selecting instruction corresponding to a motion direction of the motion of the input apparatus in the electronic device relative to the electronic device, based on the second display position and the motion direction.

The second response sub-unit 1155 is configured to respond to the display object selecting instruction to select a plurality of display objects during the motion of the input apparatus of the electronic device relative to the electronic device from the second display position.

As shown in FIG. 9, the position of the cursor (a black line segment) shown in FIG. 9 is the second display position. In the case where the input apparatus moves downward relative to the electronic device, the second response sub-unit 1155 start to select the words (the display object) displayed on the second display interface from the second display position downward. In the case where the motion of the input apparatus relative to the electronic device is ended, the selection of the words is ended, thereby completing the process of executing the display object selecting instruction.

For the response control method and the electronic device according to the embodiments of the disclosure described above, the input position of the first operation for the input apparatus is acquired by operating the movable input apparatus in the electronic device, a motion parameter of the motion of the input apparatus relative to the electronic device is acquired in the case where the input position of the first operation remains unchanged, and an executive instruction is determined and responded to based on the input position and the motion parameter. It can be seen that, in the embodiment of the disclosure, in the case where the movable input apparatus is provided in the electronic device, an operation is performed on the movable input apparatus, instead of operation on the fixed touch screen in the related electronic device, and the executive instruction is determined and responded to based on the first operation to the movable input apparatus.

Figure 17:
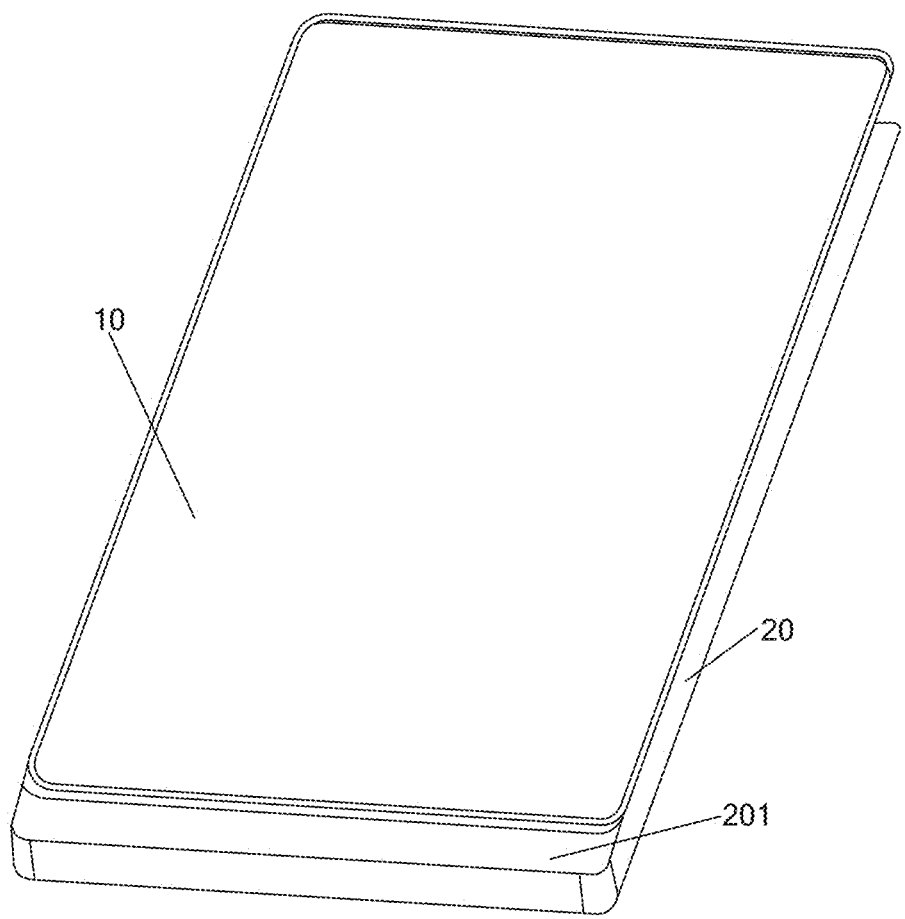
FIG. 17 is a schematic configuration diagram of an electronic device according to an embodiment of the disclosure.

FIG. 17 is a schematic configuration diagram of an electronic device according to an embodiment of the disclosure. As shown in FIG. 17, the electronic device according to the embodiment of the disclosure includes a first body 10, a second body 20 and at least two connection apparatus. The first body 10 and the second body 20 are laminated; the at least two connection apparatus are located between the first body 10 and the second body 20, and the first body 10 is slidably connected to the second body 20 via the at least two connection apparatus. The first body moves relative to the second body, in this case, the first body is used as a first input apparatus of the electronic device. The relative motion of the first body as the first input apparatus to the second body is implemented as follows. A force is applied by the user of the electronic device to the first body to push the first body to move relative to the second body. The electronic device acquires a motion parameter of the relative motion of the first body to the second body, and generates a control instruction based on the motion parameter, so that the electronic device makes a response.

The electronic device according to another embodiment of the disclosure may further include a display screen and a second input apparatus. A sensing region of the second input apparatus is overlapped with a display output region of the display screen. The display screen and the second input apparatus are included in the first body. The display output region and the sensing region both are exposed through the first body. In this case, the first body as the first input apparatus further includes the second input apparatus, and the electronic device generates the control instruction via the first input apparatus and the second input apparatus, so that the electronic device makes a response. For example, in the case where the force is applied by the user of the electronic device to the first body to push the first body to move relative to the second body, a finger of the user as the operator will apply a force to a certain sensing point in the sensing region, and therefore, the sensing region (the second input apparatus) can acquire a contacted sensing point or a pressed sensing point, and the electronic device may determine the control instruction based on the sensing point acquired by the second input apparatus and the motion parameter of the relative motion of the first body to the second body. Alternatively, the electronic device may determine an input from the user, and a control instruction corresponding to the input from the user, based on the sensing point acquired by the second input apparatus and the motion parameter of the relative motion of the first body to the second body.

In the embodiment of the disclosure, the electronic device may be a mobile phone, a game console, a tablet computer and the like. Particularly, the mobile phone may be a slidable mobile phone with a main body and a display screen slidably relative to each other.

Figure 18:
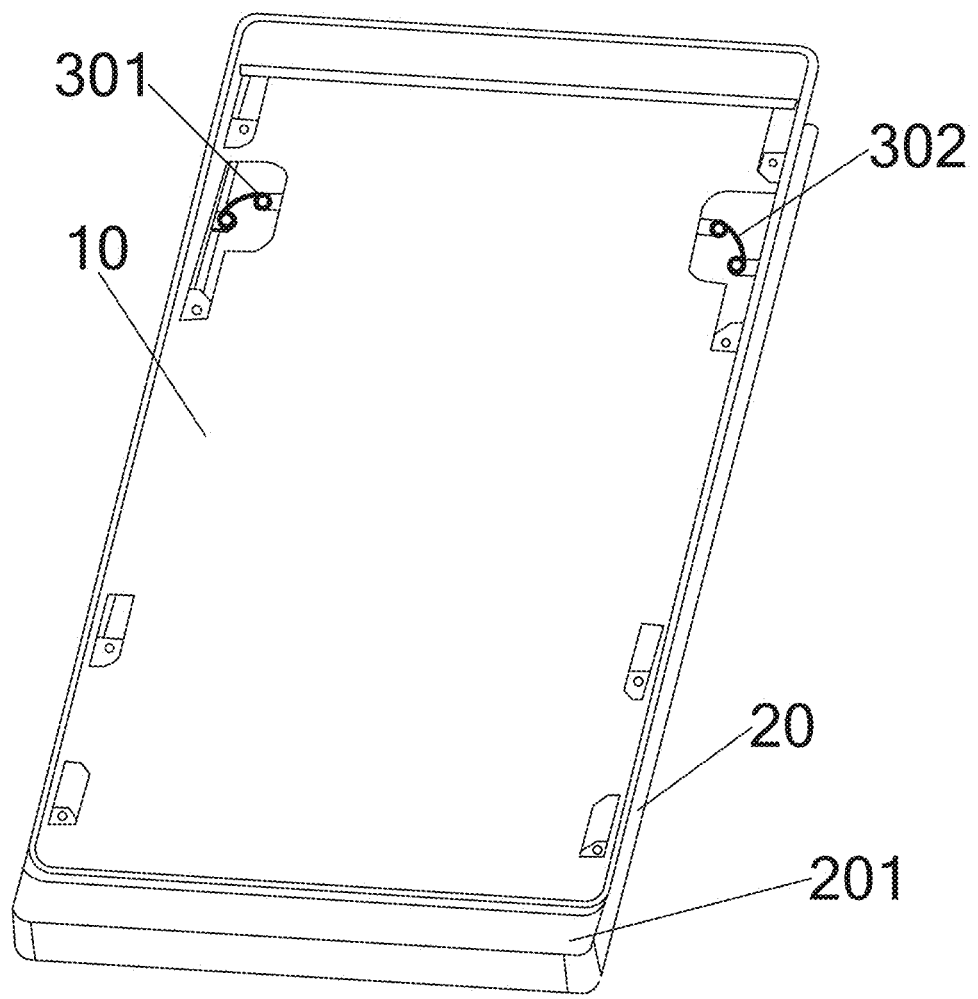
FIG. 18 is a schematic diagram of a position of a connection apparatus in an electronic device according to an embodiment of the disclosure.

FIG. 18 is a schematic diagram of a position of a connection apparatus in an electronic device according to an embodiment of the disclosure. As shown in FIG. 18, the at least two connection apparatus may include a first connection apparatus 301 and a second connection apparatus 302 respectively, the first connection apparatus 301 and the second connection apparatus 302 are symmetrically arranged, a structure of the first connection apparatus 301 is the same as that of the second connection apparatus 302, a sliding distance provided by the first connection apparatus 301 is the same as that of the second connection apparatus 302.

The first body 10 is slidably connected to the second body 20 via the at least two connection apparatus, the first body 10 can slide into a first state relative to the second body 20 via the at least two connection apparatus, or the first body 10 can slide into a second state relative to the second body 20 via the at least two connection apparatus. The first body 10 in the first state is at a first utmost position of the sliding distance provided by the at least two connection apparatus, and the first body 10 in the second state is at a second utmost position of the sliding distance provided by the at least two connection apparatus.

In the embodiment of the disclosure, the at least two connection apparatus may include four connection apparatus. The connection apparatus are symmetrically arranged between the first body 10 and the second body 20. As shown in FIG. 18, the first connection apparatus 301 and the second connection apparatus 302 are symmetrically arranged along a central axis of the electronic device. As an implementation, in the case where the at least two connection apparatus includes two connection apparatus, the two connection apparatus may be symmetrically arranged along a diagonal line of the electronic device, that is, the two connection apparatus are symmetrically arranged with respect to the center of the electronic device. In the case where the connection apparatus are symmetrically arranged, the first body 10 can slide more smoothly relative to the second body 20.

In the case where the at least two connection apparatus include four connection apparatus, the four connection apparatus may be symmetrically arranged along two central axes of the electronic device respectively. In this case, the four connection apparatus may also be centro-symmetrically arranged with respect to the center of the electronic device respectively. It should be noted that sliding distances provided by four connection apparatus are the same in the case where there are the four connection apparatus.

In the embodiment of the disclosure, in the case where the first body 10 and the second body 20 of the electronic device are connected via the at least two connection apparatus, the first body 10 in the first state is at the first utmost position of the sliding distance provided by the at least two connection apparatus, and the first body 10 in the second state is at the second utmost position of the sliding distance provided by the at least two connection apparatus. The first utmost position corresponds to an upper end of a slide groove provided by the connection apparatus, and the second utmost position corresponds to an lower end of the slide groove provided by the connection apparatus; alternatively, the first utmost position corresponds to an lower end of a slide groove provided by the connection apparatus, and the second utmost position corresponds to an upper end of the slide groove provided by the connection apparatus.

In the embodiment of the disclosure, the distance value of the sliding distance provided by the at least two connection apparatus is less than a length value of a first edge of the first body 10 arranged correspondingly to the at least two connection apparatus; or the distance value of the sliding distance provided by the at least two connection apparatus is less than a length value of a first edge of the second body 20 arranged correspondingly to the at least two connection apparatus.

Since the connection apparatus are arranged on two symmetrical edges of the first body 10 or the second body 20, the sliding distance provided by the connection apparatus is less than an edge length of the edge of the first body 10 or the second body 20, on which edge the connection apparatus are arranged. In the case where the at least two connection apparatus include four connection apparatus symmetrically arranged, two connection apparatus are arranged on each edge of the first body 10 or the second body 20. In this case, the sliding distance provided by the connection apparatus is less than half of the edge length of the edge on which the connection apparatus are arranged. That is to say, the sliding distance provided by the connection apparatus is less than half of a long edge length in the case where the connection apparatus are arranged on the long edge of the first body 10 or the second body 20; or the sliding distance provided by the connection apparatus is less than half of a short edge length in the case where the connection apparatus are arranged on the short edge of the first body 10 or the second body 20.

In the embodiment of the disclosure, an upper surface 201 of the second body 20 is an upper surface formed by extending a second edge, on which the at least two connection apparatus are not arranged, along the first edge by the sliding distance, to expose the upper surface of the second body 20 in the case where the first body 10 slides into the first state relative to the second body 20; or to expose the upper surface of the second body 20 in the case where the first body 10 slides into the second state relative to the second body 20. As shown in FIG. 17 and FIG. 18, the upper surface of the second body 20 is exposed in the case where the first body 10 is pushed upward relative to the second body 20 via the at least two connection apparatus.

Figure 19:
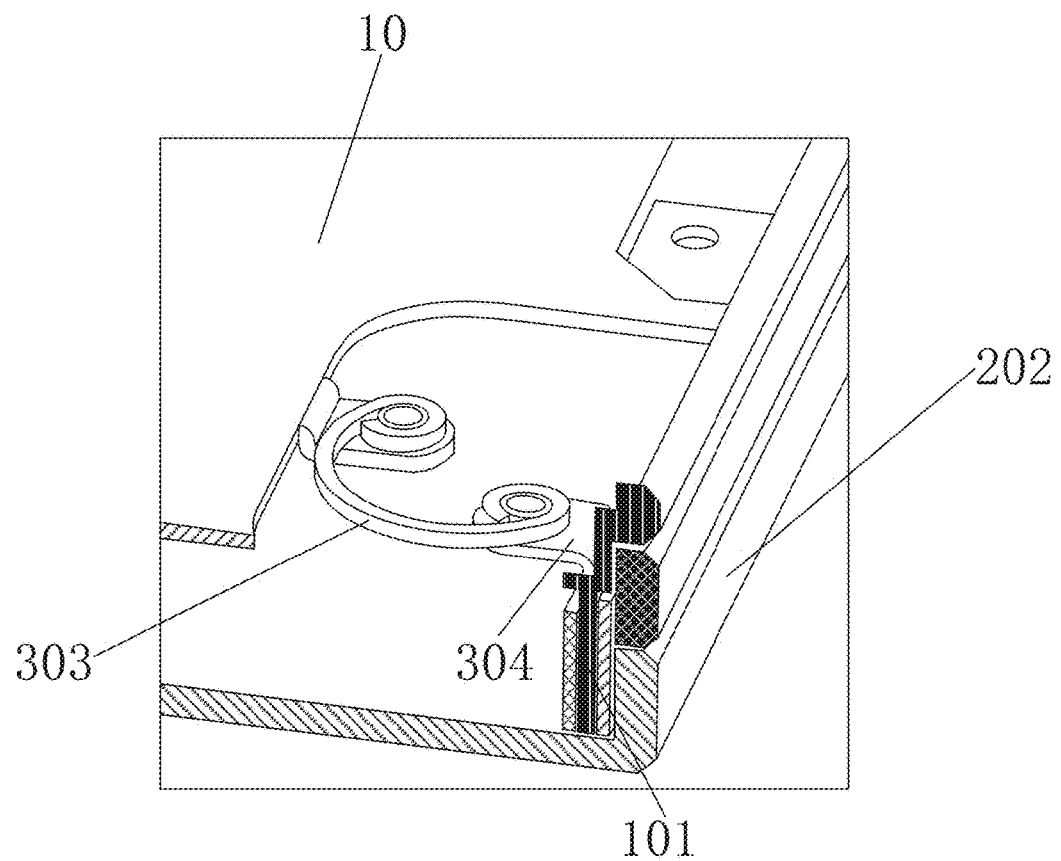
FIG. 19 is a schematic configuration diagram of a connection apparatus in an electronic device according to an embodiment of the disclosure.

FIG. 19 is a schematic configuration diagram of a connection apparatus in an electronic device according to an embodiment of the disclosure. As shown in FIG. 19, a lower surface of the second body 20 has a first shape, a sidewall of the second body 20 is formed by extending the lower surface of the second body 20 upward.

a first accommodating space is formed by the lower surface of the second body 20, the sidewall of the second body 20 and the upper surface of the second body 20;

a slide way is formed by fixing a first connector 304 of the first connection apparatus to the first sidewall;

a lower surface of the first body 10 has a second shape, a sidewall of the first body 10 is formed by extending the lower surface of the first body 10 upward, a second accommodating space is formed by the lower surface of the first body 10 and the sidewall of the first body 10, a protrusion 101 is formed by extending a part of the lower surface of the first body 10 corresponding to the connection apparatus downward, and the protrusion 101 is accommodated in the slide way; and a length of the first connector is equal to the sliding distance provided by the first connection apparatus.

In the embodiment of the disclosure, the electronic device further includes:

M electrical components respectively placed in the first accommodating space and the second accommodating space;

the M electrical components include:

a sensing element, configured to acquire a relative motion of the first body 10 to the second body 20; and a processing element, configured to determine a respective response instruction based on the acquired relative motion of the first body 10 to the second body 20.

The electronic device executes the response instruction to control the change of output for the electronic device. The change of the output described in the embodiments of the disclosure includes two kinds as follows. The change of a first kind relates to a display output, which includes: 1. the switching or changing of different display interfaces for the same application, then the switching or changing instruction which may be performed by the electronic device is the response instruction; alternatively, 2. the switching or changing of display interfaces for different applications, then the switching or changing instruction which may be performed by the electronic device is the response instruction; alternatively, 3. the change of display effect of an display interface or the displayed content, namely the change of parameters of the display effect, such as the change in size, brightness, color, or transparency, then the instruction for adjusting the parameters of the display effect is the response instruction. The change of a second kind relates to an audio output, which includes: 1. the switching or changing of audio data, then the switching or changing instruction is the response instruction; 2. the change of output effect for the audio data, namely the change of parameters of the output effect for the audio data, such as the change in volume, then the instruction for adjusting the parameters of the output effect for the audio data is the response instruction. There is a case where the change of the output described in the embodiments of the disclosure includes the change of both the display output and the audio output, for example, a video (including an image and a sound) is viewed via a video play application program, and the instruction for adjusting progress parameters of the video is triggered upward or downward, in which the progress parameters of the video include the switching of the displayed picture and the switching of the respective audio. Since a video picture is matched with a long edge of the display screen when a video is played via the video play application program, so the user holds the electronic device in a landscape mode. In this case, the up and down relative motion between the two bodies via the at least two connection apparatus in the electronic device corresponds to the left and right of the user of the electronic device and also corresponds to the forward and backward of the video data played by the video play application program in the case where the electronic device is held by the user in a landscape mode. Therefore, it is more favorable to perform the relative motion between the two bodies of the electronic device when the user views the video, and the processing efficiency and usage efficiency of the electronic device are improved.

In the embodiment of the disclosure, the sensing element is configured to detect a sliding state of the first body 10 relative to the second body 20. In the case where the sliding state of the first body 10 relative to the second body 20 is determined, the processing element is notified to performs a respective process based on the sliding state of the first body 10 relative to the second body 20, and the processing element outputs the processed result via an output apparatus such as the display screen of the electronic device. For example, as an implementation, the electronic device may be kept in a first operating state such as a short message opening state, in the case where the first body 10 is in the first state relative to the second body 20; or the electronic device may be kept in a second operating state such as a normal operating state of the electronic device, in the case where the first body 10 is in the second state relative to the second body 20.

In the embodiment of the disclosure, the M electrical components include an indicating apparatus and a display screen.

The indicating apparatus is arranged on the upper surface of the second body 20, and the indicating apparatus may be a touch-control region, or may also be an operation keyboard.

The display screen is arranged in the second accommodating space of the first body 10, and a display output region of the display screen is exposed through an upper surface of the first body 10.

The indicating apparatus is exposed on the upper surface of the second body 20 in the case where the first body 10 slides to the first utmost position relative to the second body 20. That is to say, the indicating apparatus is exposed through the upper surface of the second body 20 in the case where the first body 10 is pushed to an upper utmost position provided by the connection apparatus.

In the embodiment of the disclosure, each of the at least two connection apparatus includes:

a damping apparatus 303, wherein a first end of the damping apparatus 303 is fixedly connected to the first connector 304, and a second end of the damping apparatus 303 is fixedly connected to the lower surface of the second body 20.

During the slide of the first body 10 relative to the second body 20 from the first utmost position to the second utmost position via the connection apparatus, an increasing first damping force is provided by the damping apparatus 303 during the slide of the first body 10 relative to the second body 20 from the first utmost position to a first position, a diminishing first thrust force is provided by the damping apparatus 303 during the slide of the first body 10 relative to the second body 20 from the first position to the second utmost position, wherein a utmost first damping force is provided by the damping apparatus 303 when the first body 10 slides relative to the second body 20 from the first utmost position to the first position, a utmost first thrust force is provided by the damping apparatus 303, instead of the utmost first damping force, when the first body 10 starts to be slid relative to the second body 20 from the first position to the second utmost position; and the direction of the first damping force is opposite to that of the first thrust force.

During the slide of the first body 10 relative to the second body 20 from the second utmost position to the first utmost position via the connection apparatus, an increasing second damping force is provided by the damping apparatus 303 during the slide of the first body 10 relative to the second body 20 from the second utmost position to the first position, a diminishing second thrust force is provided by the damping apparatus 303 during the slide of the first body 10 relative to the second body 20 from the first position to the first utmost position, wherein a utmost second damping force is provided by the damping apparatus 303 when the first body 10 slides relative to the second body 20 from the second utmost position to the first position, a utmost second thrust force is provided by the damping apparatus 303, instead of the utmost second damping force, when the first body 10 starts to be slid relative to the second body 20 from the first position to the first utmost position; and the direction of the second damping force is opposite to that of the second thrust force.

That is to say, the first body 10 may be in the first state or the second state relative to the second body 20 in the absence of external forces, by providing the damping apparatus 303 in the connection apparatus according to the embodiment of the disclosure.

In the embodiment of the disclosure, the damping apparatus 303 is an elastic part having a curvature.

A damping force or a thrust force is provided by straining the curvature of the damping apparatus 303; the elastic part is strained to be in a maximum curvature during the slide of the first body 10 relative to the second body 20 from the first utmost position to the second utmost position when the first body 10 slides to the first position relative to the second body 20; and a first connection position is closest to a second connection position.

The technical solutions described in the embodiments of the disclosure may be combined in any manner without conflict.

In the above technical solutions according to the embodiments, the first body and the second body of the electronic device are laminated and connected via the at least two connection apparatus, and the first body is slidable relative to the second body. There is an even number of the connection apparatus and the connection apparatus are symmetrically arranged in the embodiments of the disclosure, so that the first body can slide more smoothly relative to the second body. Moreover, the first body may be kept in the first state or the second state relative to the second body by providing the connection apparatus, wherein the first body in the first state is at a first utmost position of the sliding distance provided by the at least two connection apparatus, and the first body in the second state is at a second utmost position of the sliding distance provided by the at least two connection apparatus. The electronic device may be in the first operating state or the second operating state respectively by keeping the first body in the first state or the second state relative to the second body. Therefore, it is more favorable for the user to use the electronic device, and a better user experience is provided.

In the several embodiments provided by the present disclosure, it should be noted that, the method and electronic device disclosed herein may be implemented in other manners. And the embodiments of the device described above are only schematic. For example, the division of the units is only a division on logical function, and there may be other division modes in the practical implementation. For instant, multiple units or components may be integrated to another system or combined; and some features may be omitted or unperformed.

In addition, the components displayed or discussed above may be coupled, directly coupled or connected through some interfaces for communication. The indirect coupling or communication connection between the devices or units may be electrical, mechanical or other forms.

In the above, the unit which is described as a separate component may be or may be not separate in physical. The component displayed as a unit may be or may be not a physical unit. That is, the component may locate at one place or may be distributed on multiple network units. The object of the present embodiment may be achieved by selecting a part or all of the units according to the practical needs.

Furthermore, function units in the embodiments of the present disclosure may be integrated in one processing unit; each of the function units may be a single unit; or two or more function units integrated in one unit. And the above integrated unit may be realized using a form of hardware or using a form of hardware plus software function unit.

It can be understood that each of the apparatus and units in the embodiments of the electronic device described above may be a separate unit, and the above separate units may be combined in any manner according to the practical situation in the practical application, and the electronic devices obtained in any combination are not set forth one by one in the embodiments of the present disclosure. Moreover, the embodiments of the present disclosure are described herein in a progressive manner, with an emphasis placed on explaining the difference between each embodiment and the other embodiments; hence, for the same or similar parts among the embodiments, they can be referred to from one another. For the device disclosed in the embodiments, the corresponding descriptions are relatively simple because the device corresponds to the method disclosed in the embodiments. The relevant portions may be referred to the description for the method parts.

Finally, it should be noted that, in the present disclosure, relational terms such as "first" and "second" are used only to distinguish one entity or operation from the other entity or operation, but not necessarily demand or imply that there is actual relation or order among those entities and operations. Furthermore, the terms "including", "containing", or any other variations thereof means a non-exclusive inclusion, so that the process, method, article or device that includes a series of elements includes not only these elements but also other elements that are not explicitly listed, or further includes elements inherent in the process, method, article or device. Moreover, when there is no further limitation, the element defined by the wording "include(s) a . . . " does not exclude the case that in the process, method, article or device that includes the element there are other same elements.

The response control method and the electronic device according to the disclosure are introduced in details above, the principle and embodiments of the disclosure are set forth by using specific examples herein, and the description of the embodiments above only is used to aid the reader in understanding the method according to the disclosure and the core concepts of the disclosure. Moreover, changes may be made to the specific embodiments and the field of application by those skilled in the art in light of the concepts of the disclosure. In summary, the description of the specification should not be construed as restriction for the disclosure.

What is claimed is:

1. A response control method, applied to an electronic device having an input apparatus which is movable relative to a main body of the electronic device wherein the input apparatus comprises a display screen, the method comprising:

determining a currently executed application displayed on the display screen;

detecting a click operation performed by an operator on the input apparatus;

determining a position of the click operation on the input apparatus;

acquiring a motion parameter of the input apparatus relative to the main body, wherein the input apparatus moves relative to the main body under a force of the operator at the same time the click operation at the position on the input apparatus is maintained, and wherein the motion parameter comprises at least a direction of motion of the input apparatus relative to the main body; and performing a function on the currently executed application based on the position of the click operation, the motion parameter, and the currently executed application, according to a correspondence among the position, the motion parameter, and the currently executed application, wherein the correspondence is pre-stored in the electronic device, and wherein different functions are performed on different applications under a same motion parameter and a same position.

2. The method according to claim 1, wherein the step of performing the preset function comprises:

determining and responding to an instruction based on the position of the click operation, the motion parameter, and the currently executed application.

3. A response control method, applied to an electronic device having an input apparatus which is movable relative to a main body of the electronic device, wherein the input apparatus comprises a display screen, the method comprising:

determining a currently executed application displayed on the display screen;

acquiring a click operation performed by an operator on the input apparatus, wherein the input apparatus corresponds to a display screen of the electronic device;

determining a position of the click operation on the input apparatus;

acquiring a motion parameter of the input apparatus relative to the main body, wherein the input apparatus moves relative to the main body under a force of the operator at the same time the click operation at the position on the input apparatus is maintained, and wherein the motion parameter comprises at least a direction of motion of the input apparatus relative to the main body; and determining and responding to an instruction of the currently executed application based on the position of the click operation, the motion parameter, and the currently executed application, according to a correspondence among the position, the motion parameter, and the currently executed application, wherein the correspondence is pre-stored in the electronic device, and wherein different functions are performed on different applications under a same motion parameter and a same position.

4. The method according to claim 3, wherein the input apparatus is a touch display screen, the method further comprising, before the acquiring the click operation performed by the operator on the input apparatus, controlling the touch display screen to display a first display interface; and the determining and responding to the instruction based on the input position, the motion parameter, and the currently executed application comprises:

determining a first display position in the first display interface based on the input position of the click operation;

generating a zoom-in instruction for the first display interface, if the motion parameter is a first motion parameter, or generating a zoom-out instruction for the first display interface if the motion parameter is a second motion parameter; and executing the zoom-in instruction or the zoom-out instruction for the first display interface, centered on the first display position.

5. The method according to claim 4, further comprising:
acquiring a duration during which the motion parameter is acquired continuously and determining a multiple of responses during the duration, if the input position exists and remains unchanged and the motion parameter is acquired continuously.

6. The method according to claim 3, further comprising: controlling the display screen to display a second display interface, wherein the second display interface comprises M display objects, where M is an integer greater than or equal to 1, and an input unit in the input apparatus corresponds to a display unit in the display screen;

the determining and responding to the instruction based on the input position, the motion parameter, and the currently executed application comprises:

determining a second display position in the second display interface based on the position of the click operation;

determining the instruction based on the motion parameter; and responding to the instruction based on the second display position.

7. The method according to claim 6, wherein the responding to the instruction based on the second display position comprises:

determining a first display object corresponding to the second display position in the second display interface;

generating a movement instruction corresponding to a motion direction of the motion of the input apparatus relative to the main body; and responding to the movement instruction to change a relative position of the first display object in the second display interface based on the motion direction; or the responding to the executive instruction based on the second display position comprises:

generating a display object selecting instruction corresponding to a motion direction of the motion of the input apparatus relative to the main body; and responding to the display object selecting instruction to select a plurality of display objects during the motion of the input apparatus relative to the main body from the second display position.

* * * * *